United States Patent [19]

Tateishi et al.

[11] Patent Number: 4,954,982
[45] Date of Patent: Sep. 4, 1990

[54] METHOD AND CIRCUIT FOR CHECKING STORAGE PROTECTION BY PRE-CHECKING AN ACCESS REQUEST KEY

[75] Inventors: Terutaka Tateishi; Minoru Koshino, both of Kanagawa; Kazuyuki Shimizu, Tokyo, all of Japan

[73] Assignee: Fujitsu Limited, Kawasaki, Japan

[21] Appl. No.: 315,213

[22] Filed: Feb. 24, 1989

Related U.S. Application Data

[63] Continuation of Ser. No. 75,258, Jul. 16, 1987, abandoned, which is a continuation of Ser. No. 533,988, Sep. 20, 1983, abandoned.

[30] Foreign Application Priority Data

Sep. 29, 1982 [JP] Japan .................................. 57-170080

[51] Int. Cl.⁵ .............................................. G06I 12/14
[52] U.S. Cl. .................................. 364/900; 364/969; 364/969.2; 364/948.1; 364/947.5
[58] Field of Search ... 364/200 MS File, 900 MS File

[56] References Cited

U.S. PATENT DOCUMENTS

| | | | |
|---|---|---|---|
| 3,284,776 | 11/1966 | Freedman | 364/200 |
| 3,328,765 | 6/1967 | Amdahl et al. | 364/200 |
| 3,328,768 | 6/1967 | Amdahl et al. | 364/200 |
| 3,377,626 | 4/1968 | Nelson et al. | 364/200 |
| 3,576,544 | 4/1971 | Cordero, Jr. et al. | 364/200 |
| 3,825,903 | 7/1974 | Brown | 364/200 |
| 4,035,779 | 7/1977 | Birney et al. | 364/200 |
| 4,037,214 | 7/1977 | Birney et al. | 364/200 |
| 4,038,645 | 7/1977 | Birney et al. | 364/200 |
| 4,135,240 | 1/1979 | Ritchie | 364/200 |
| 4,214,304 | 7/1980 | Shimizu et al. | 364/200 |
| 4,472,790 | 9/1984 | Bark et al. | 364/900 |
| 4,521,846 | 6/1985 | Scalzi et al. | 364/200 |

FOREIGN PATENT DOCUMENTS 2010640 11/1970 Fed. Rep. of Germany .

OTHER PUBLICATIONS

European Search Report, The Hague, Mar. 11, 1986.

*Primary Examiner*—Thomas C. Lee
*Attorney, Agent, or Firm*—Staas & Halsey

[57] ABSTRACT

A storage-protection-check circuit includes a storage key corresponding to the unit area of a storage region, the storage key being stored in a key storage. The value of the access request key having an access request corresponding to the storage region is checked. When the access request key has a specified value, the storage region is accessed without reading the storage key out of the key storage.

9 Claims, 4 Drawing Sheets

METHOD AND CIRCUIT FOR CHECKING STORAGE PROTECTION BY PRE-CHECKING AN ACCESS REQUEST KEY

This is a continuation of co-pending application Ser. No. 075,258 filed on July 16, 1987 now abandoned, which is a continuation of copending application, Ser. No. 533,988, filed on Sept. 20, 1983 now abandoned.

BACKGROUND OF THE INVENTION

The present invention relates to a method for checking storage protection in a system providing a storage-protection key in each unit area.

The criteria in a method for checking storage-protection are well known, for instance as described in "IBM System/370 Principles of Operation" (GA 22-7000-6 File No. 370-01). That is, a main storage device is divided into a plurality of pages as a unit of storage protection, for example, into two-kilobyte blocks, and storage keys having eight bits are written into a key storage. The storage keys have the following construction:

| 0 | 1 | 2 | 3 | 4 | 5 | 6 | 7 |
|---|---|---|---|---|---|---|---|
| A |   |   |   | F | R | C | S |

In the above construction, A denotes an access control bit, F denotes a read protection bit, R denotes a reference bit, C denotes a change bit, and S denotes a write protection bit. A central processing unit or a channel provides a protection key. The central processing unit provides a protection key in program-status words (PSW) and a storage key in translation look aside buffers (TLB). The channel reads the channel-address words (CAW) and maintains the protection key written into the CAW. The following table gives a summary of the protecting action.

TABLE

| Condition Bit position in storage key | | Is access to main storage possible? | | |
|---|---|---|---|---|
| Bit 7 (S) | Bit 4 (F) | Key relation | Read | Store |
| 0 | 0 | coincident | possible | possible |
|   | 0 | incoincident | possible | impossible |
|   | 1 | coincident | possible | possible |
|   | 1 | incoincident | impossible | impossible |
| 1 | 0 | coincident | possible | impossible |
|   | 0 | incoincident | possible | impossible |
|   | 1 | coincident | possible | impossible |
|   | 1 | incoincident | impossible | impossible |

In the table, "coincident" indicates that the protection key is equal to the upper four bits or that the value of the protection key is zero. "Possible" indicates that access is possible and "not possible" indicates that access is not possible. That is, when information is read out of the main storage, the information cannot be used in the program, and when information is written into the main storage, the position of the storage is not changed. The write signal transmitted to the main storage is accepted when the storage key and the protection key coincide and the write protection bit of the storage key is zero. The read signal transmitted from the main storage is accepted when the storage key and the protection key coincide or the write protection bit of the storage key is zero.

However, in such conventional criteria, the time during which the next key memory access request is awaited becomes long and the key memory cannot be efficiently accessed.

SUMMARY OF THE INVENTION

An object of the present invention is to provide a method for checking memory protection by which memory protection of an access request to the main storage can be rapidly checked.

The above-mentioned object can be achieved by providing a method for checking storage protection in a system in which a storage key corresponding to a unit area of a storage region is provided in each unit area and the storage key is stored in a key storage, comprising pre-checking the value of the key to which access is requested following an access request to the storage region and when the value is a specified value, immediately effecting access to the storage region without reading the storage key out of the key storage.

Further, the above-mentioned object can be achieved by providing a storage-protection-check circuit comprising: an access control circuit which receives an access request from a channel; a main storage control circuit and a storage-protection key control circuit which are controlled by the access control circuit; a main storage which is controlled by the main storage control circuit; a key storage which is controlled by the storage-protection key control circuit; and a storage-protection-check circuit which receives an access request key from the channel, a key storage check signal from the storage-protection key control circuit, and a storage key from the key storage and outputs a main storage access admission signal to the access control circuit, the storage-protection-check circuit comprising a zero check circuit which receives the access request, a coincidence check circuit which receives the access request and the storage key from the key storage, a first AND circuit which receives the output of the zero check circuit and a key storage access request from the access control circuit, a second AND circuit which receives via a NOT circuit the output of the zero check circuit and the key storage access request and outputs a key storage access admission signal to the storage-protection key control circuit, a third AND circuit which receives the output of the coincidence check circuit and the key storage check signal from the storage-protection key control circuit, and an OR circuit which receives the outputs of the first AND circuit and the second AND circuit and outputs the main storage access admission signal to the access control circuit.

Further features and advantages of the present invention will be apparent from the ensuing description, with reference to the accompanying drawings, to which, however, the scope of the invention is in no way limited.

DESCRIPTION OF THE PREFERRED EMBODIMENTS

Figure 1:
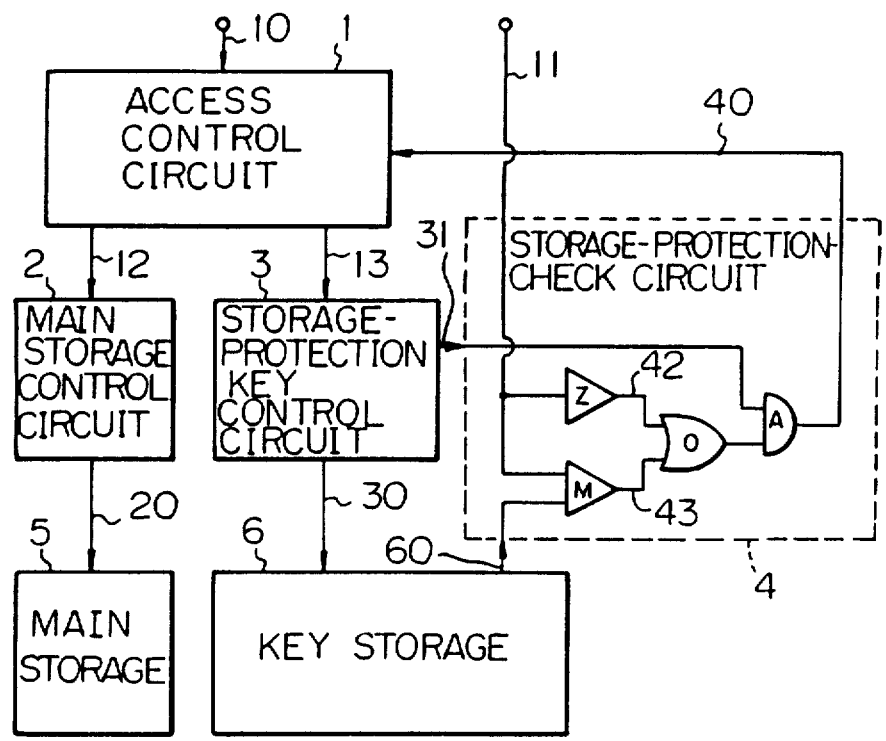
FIG. 1 is a block diagram illustrating one example of a conventional storage-protection-check circuit.

FIG. 1 shows a conventional storage-protection-check circuit. In the figure, 1 denotes an access control circuit, 2 denotes a main storage control circuit, 3 denotes a storage-protection key control circuit, 4 denotes a storage-protection-check circuit, 5 denotes a main storage, 6 denotes a key storage, 10 denotes an access request, 11 denotes an access request key, 12 denotes a main storage access request, 13 denotes a key storage access request, 20 denotes a line which transmits main storage access information, 30 denotes a line which transmits key storage access information, 31 denotes a key storage check signal, 40 denotes a main storage access admission signal, 42 denotes a zero check signal, 43 denotes a coincidence signal, Z denotes a zero check circuit, M denotes a coincidence check circuit, O denotes an OR circuit, and A denotes an AND circuit.

The access control circuit 1 analyzes the access request and controls the main storage control circuit 2 and the storage-protection key control circuit 3 in accordance with the result of analysis The main storage control circuit 2 controls the main storage 5, and the storage-protection key control circuit 3 controls the key storage 6. The storage-protection-check circuit 4 includes the zero check circuit Z, the coincidence check circuit M, the OR circuit O, and the AND circuit A. The zero check circuit Z determines whether or not the access request key 11 is zero, and the coincidence check circuit M determines whether or not the access request key 11 and the storage key 60 read from the key storage 6 are coincident. The access request key 11 includes both key information and read/write information. When the zero check signal 42 is logic "1" or the coincidence signal 43 is logic "1", the OR circuit O outputs logic "1". When the key storage check signal 31 becomes logic "1" and the OR circuit "O" outputs logic "1", the main storage access admission signal 40 becomes logic "1". The key storage check signal 31 is output at a suitable time when data is read out of the key storage 6.

When the channel accesses the main storage via a block barrier of pages, the channel sends an access request having a key check to the access control circuit 1. Further, since the central processing unit reads the storage key into the TLB before receiving this access request, the central processing unit checks whether a request for main storage access is possible or not. When the access control circuit 1 receives the access request having a key check, the access control circuit 1 sends the key storage access request 13 to the storage-protection key control circuit 3. When the storage-projection key control circuit 3 receives the key storage access request 13, it sends the key storage access information 30 to the key storage 6. The key storage access information 30 includes a read/write signal indicating read or write and key storage address information. In this case, the read/write signal indicates read. The storage key 60 which is read out of the key storage 6 is sent to the coincidence check circuit M in the storage-protection-check circuit 4. If the zero check signal 42 or the coincidence signal 43 is logic "1" when the storage-protection key control circuit 3 sends the key storage check signal 31, the value of which is logic "1", the main storage access admission signal 40 becomes logic "1". When the main storage access admission signal 40 becomes logic "1", the access control circuit 1 sends the main storage access request 12 to the main storage control circuit 2. When the main storage control circuit 2 receives the main storage access request 12, the main storage control circuit 2 sends the main storage access information 20 to the main storage 5. The main storage 5 effects read/write in accordance with the main storage access information 20.

Figure 2:
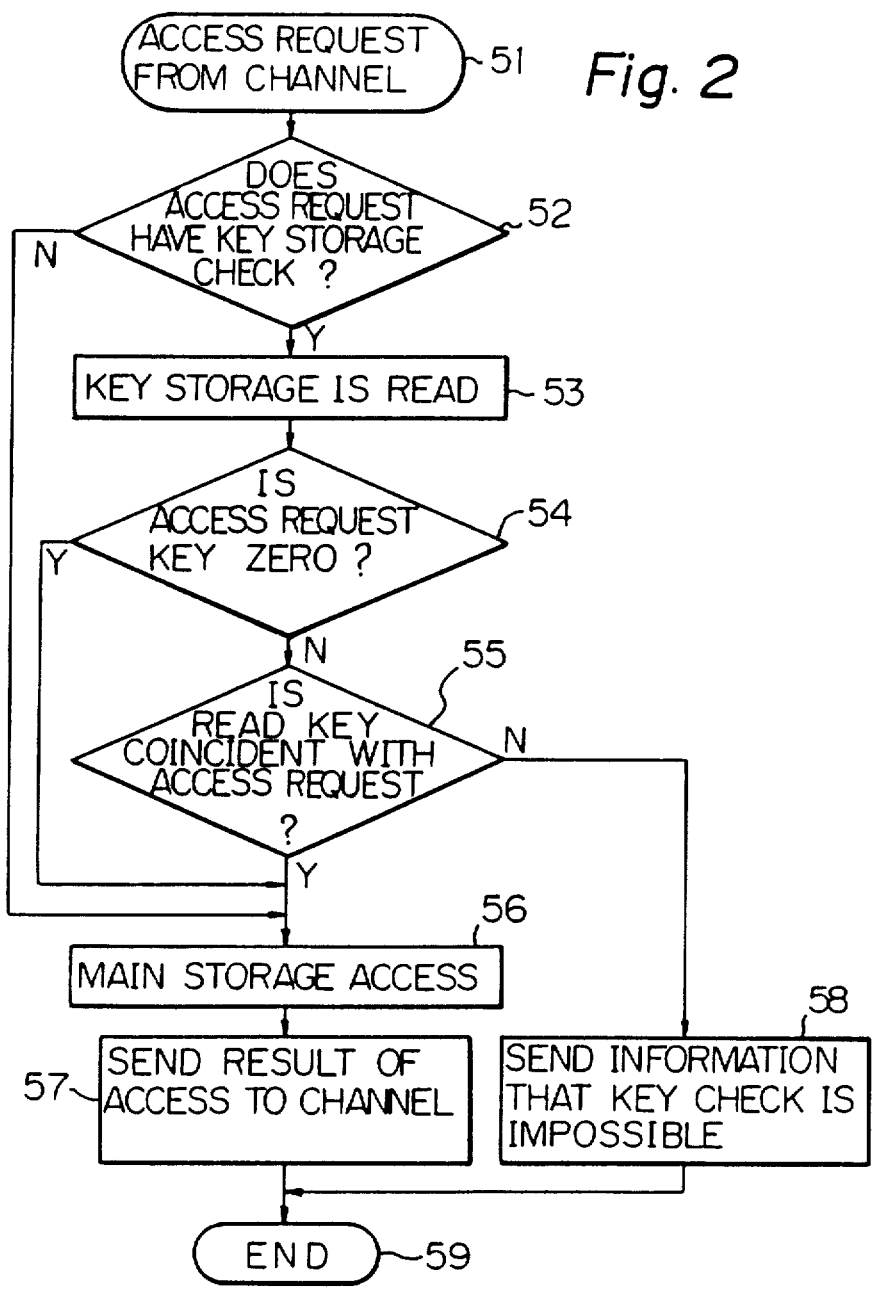
FIG. 2 is a flow chart illustrating the operation of the circuit shown in FIG. 1.

FIG. 2 is a flow chart illustrating the operation of the circuit shown in FIG. 1. In the circuit, it is checked whether or not an access request from the channel (block 51) has a key storage (block 52). If it has a key storage, the key storage is read (block 53), and it is checked in block 54 whether or not the access request key is zero. If the access request key is not zero, it is checked in block 55 whether or not the read key is coincident with the access request. If the read key is coincident with the access request, the main storage is accessed in block 56 and the result of access is sent to the channel in block 57. If the read key is not coincident with the access request, a key check is impossible.

When the access request key has a specified value, main storage access is possible regardless of the data read out of the key storage. However, in the conventional system shown in FIG. 1, even if the access request key has a specified value, the main memory access admission signal may be logic "1" when the storage check signal becomes logic "1". In such a conventional system, the time during which the next key memory access request is awaited becomes long and the key memory cannot be efficiently accessed.

Figure 3:
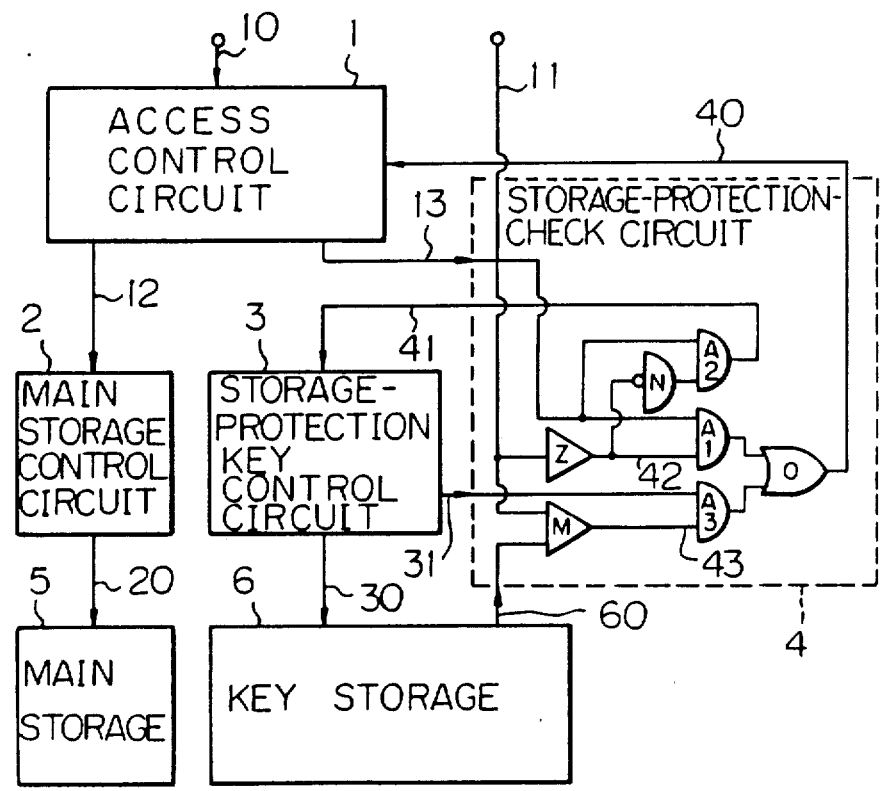
FIG. 3 is a block diagram illustrating one embodiment of the storage-protection-check circuit according to the present invention.

Next, the invention is explained with reference to FIG. 3, which illustrates one embodiment of the present invention. In FIG. 3, $A_1$ to $A_3$ denote AND circuits, N denotes a NOT circuit, and 41 denotes a key storage access admission signal. The other elements in FIG. 3 are the same as the elements in FIG. 1 and are represented by the same reference numerals as in FIG. 1. The storage-protection-check circuit 4 shown in FIG. 3 includes a zero check circuit Z, a coincidence check circuit M, the NOT circuit N, the AND circuits $A_1$ to $A_3$, and an OR circuit O. The AND circuit $A_1$ receives a zero check signal 42 and a key storage access request 13, and the AND circuit $A_3$ receives a coincidence signal 43 and a key storage check signal 31. The outputs of the AND circuits $A_1$ and $A_3$ are supplied to the input of the OR circuit O, and the output of the OR circuit O is used as a main storage access admission signal 40. The AND circuit $A_2$ receives the key storage access request 13 and an inverted signal of the zero check signal 42. The output of the AND circuit $A_2$ becomes the key storage access admission signal 41.

Next, the operation of the embodiment shown in FIG. 3 is explained. When the channel accesses, via the block barrier, a main storage 5, the channel sends an access request 10 having a key check and an access request key 11 to an access control circuit 1. When the access control circuit 1 receives the access request 10 having a key check, the access control circuit 1 sends the key storage access request 13 to the AND circuits $A_1$ and $A_2$. On the other hand, the access request key 11 is supplied to the zero check circuit Z. If the zero check signal 42 is logic "1" when the key storage access request 13 is sent to the AND circuits $A_1$ and $A_2$, the main storage access admission signal 40 becomes logic "1". When the main storage access admission signal 40 becomes logic "1", the access control circuit 1 controls so as to carry out main storage access. If the zero check signal 42 is logic "0" when the key storage access request 13 is sent to the AND circuits A₁ and A₂, the key storage access admission signal 41 is sent to a storage-protection key control circuit 3. When the storage-protection key control circuit 3 receives the key storage access admission signal 41, the circuit 3 sends key storage access information 30 to a key storage 6. A storage key 60, which is read out of the key storage 6, is supplied to the coincidence check circuit M in the storage-protection-check circuit 4. When the storage-protection key control circuit 3 turns the key storage check signal 31 on, the coincidence signal 43 is sent via the AND circuit A₃ and the OR circuit O to the access control circuit 1 so that the main storage access admission signal 40 is sent to the access control circuit 1. When the main storage access admission signal 40 is logic "1", the access control circuit 1 controls so as to carry out main storage access.

Figure 4:
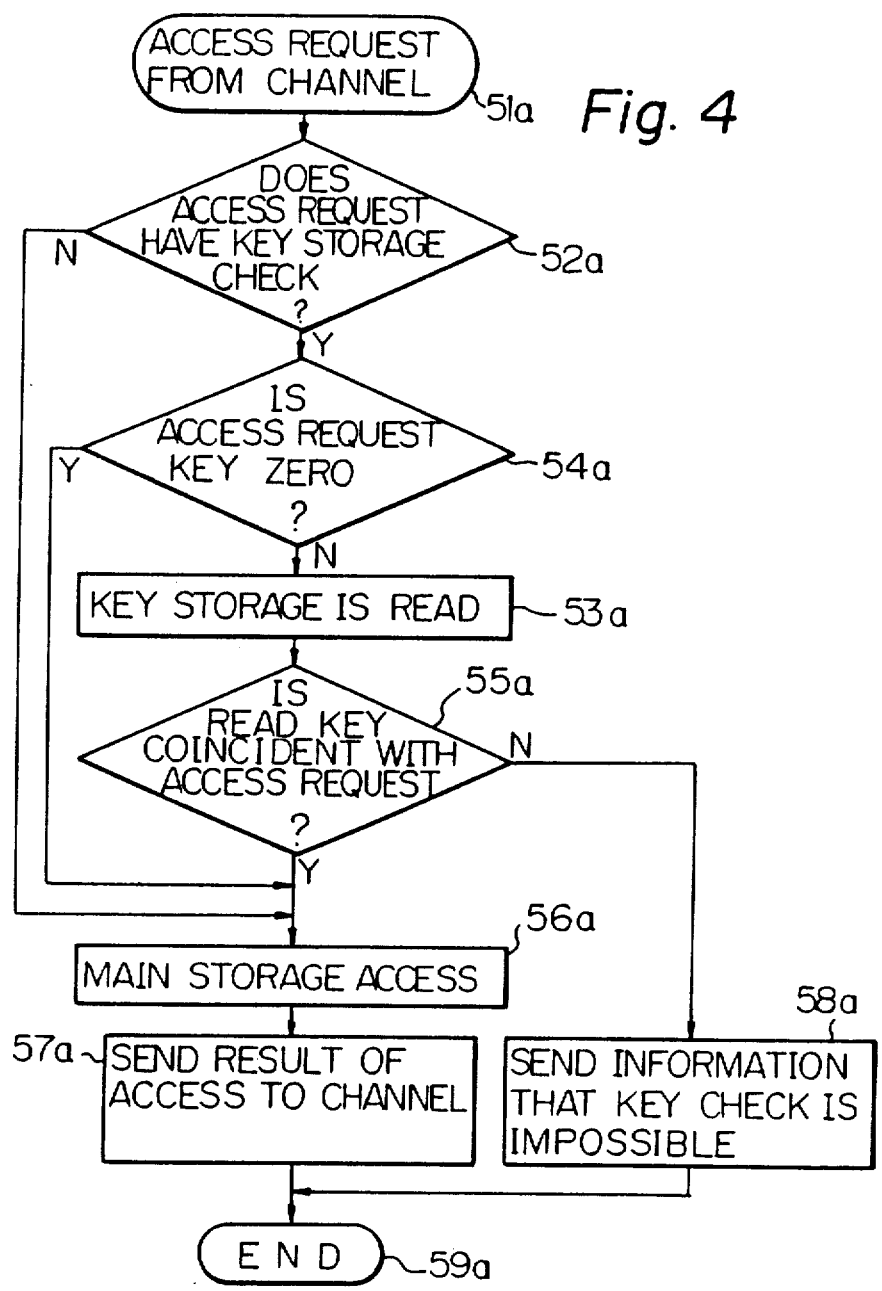
FIG. 4 is a flow chart illustrating the operation of the circuit shown in FIG. 3.

FIG. 4 is a flow chart illustrating the operation of the circuit shown in FIG. 3. In FIG. 4, blocks 51a to 59a correspond to blocks 51 to 59 in FIG. 2. The feature of FIG. 4 differs from that of FIG. 2 in that the order of blocks 53a and 54a is reversed. That is, the value of the access request key having an access request is checked in block 54a, and when the value of the access request key is zero, the main storage is accessed in block 56a.

As should be clear from the above explanation, according to the present invention, if the access request key has a specified value, the main storage can be accessed without accessing the key storage. Therefore, accessing of the key storage can be efficiently carried out.

I claim:

1. A method for checking storage protection in a system having a channel processor, a CPU, an access control unit, which receives access requests, each one of the access requests having an access key, from both the channel processor and the CPU, a main storage control unit operatively connected to a main storage having storage regions, a storage-protection key control circuit operatively connected to a key storage, and a storage-protection check circuit, the key storage storing storage keys, each one of the storage keys corresponding to a unit area of a storage region, said method comprising the steps of:

(a) pre-checking, using the storage-protection check circuit, value of the access key by which access is requested following an access request before accessing the main storage and the key storage;

(b) accessing the main storage directly without using the storage protection key control circuit and without accessing the key storage when the storage-protection check circuit determines that the access key has a predetermined value;

(c) accessing the key storage to obtain one of the storage keys when the storage-protection check circuit determines that the access key does not have the predetermined value;

(d) comparing the accessed storage key and the access request key to obtain a coincidence signal if the accessed storage key and the access request key coincide; and (e) accessing, after said accessing in step (c), the main storage based upon obtaining the coincidence signal.

2. A check circuit, for a storage system having a channel processor and a CPU which both issue access requests having an access request key, comprising an access control circuit which receives the access request from the channel processor or the CPU, a main storage control circuit and a storage-protection key control circuit which are controlled by said access control circuit, a main storage which is controlled by said main storage control circuit, a key storage which is controlled by said storage-protection key control circuit, and a storage-protection-check circuit which receives the access request key from the channel processor or the CPU, a key storage check signal from said storage-protection key control circuit, and a storage key from said key storage and outputs a main storage access admission signal to said access control circuit when the access request key is a predetermined value, said storage-protection-check circuit comprising a zero check circuit which receives said access request key, a coincidence check circuit which receives said access request key and said storage key from said key storage, a first AND circuit which receives an output of said zero check circuit and a key storage access request from said access control circuit, a second AND circuit which receives via a NOT circuit the output of said zero check circuit and said key storage access request, and outputs a key storage access admission signal to said storage-protection key control circuit, a third AND circuit which receives an output of said coincidence check circuit and said key storage check signal from said storage-protection key control circuit, and an OR circuit which receives outputs of said first AND circuit and said second AND circuit and outputs said main storage access admission signal to said access control circuit.

3. The check circuit of claim 2, wherein, when said access request key has a specified value, said main storage is accessed without said key storage being accessed.

4. A check circuit for receiving access request signals including an access request key having a logic level from a storage system and a key storage access request signal having a logic level, and for providing a main storage access admission signal to access a main storage and a key storage access admission signal to access a key storage storing a storage key, said circuit comprising:

detection means for detecting reception logic level of the access request signal and for providing a first signal;

comparison means for providing a second signal indicating whether the logic level of the access request key is equal to a predetermined value;

first output means for producing one of the key storage access admission signal and the main storage access admission signal in dependence upon the first signal provided by said detection means and the second signal provided by said comparison means;

storage-protection key control means for receiving the key storage access admission signal when said first output means outputs the key storage access admission signal, for accessing the key storage to obtain the storage key and for outputting a key storage check signal and the storage key;

coincidence means for receiving the storage key from said storage-protection key control means and the access request key and for outputting a coincidence signal if the storage key and the access request key coincide; and second output means for receiving the coincidence signal and the key storage check signal and outputting the main storage access admission signal based upon receiving the coincidence signal and the key storage check signal.

5. A check circuit as recited in claim 4, wherein, when said first output means outputs the main storage access admission signal, the main storage is accessed without accessing the key storage, and wherein, when said first output means outputs the key storage access admission signal, said storage-protection key control means accesses the key storage, then the main storage is accessed when said second output means outputs the main storage access admission signal.

6. A check circuit as recited in claim 5, wherein said first output means comprises:

a first AND circuit, operatively connected to said detection means and said comparison means to receive the first and second signals, for outputting the main storage access admission signal;

inversion means for inverting the second signal and outputting an inverted second signal; and a second AND circuit, operatively connected to said detection means and said inversion means to receive the first signal and the inverted second signal, for outputting the key storage access admission signal.

7. A check circuit as recited in claim 6, wherein said second output means comprises a third AND circuit, operatatively connected to receive the coincidence signal and the key storage check signal, for outputting the main storage access admission signal.

8. A check circuit as recited in claim 7, wherein the first signal is the key storage access request signal.

9. A method for checking storage protection in a storage system, the storage system having a main storage accessed by a main storage access admission signal and a key storage accessed storing a storage key by a key storage access admission signal, said method comprising the steps of:

(a) receiving an access request signal and an access request key from the storage system, the access request key having a logic level;

(b) generating a key storage access request signal having a logic level based on the access request signal;

(c) detecting the logic level of the key storage access request signal;

(d) determining if the logic level of the access request key is equal to a predetermined value;

(e) generating one of the key storage access admission signal and the main storage access admission signal in dependence upon said detecting in step (c) and said determining in step (d);

(f) accessing, when said outputting in step (e) outputs the main storage access admission signal, the main storage without accessing the key storage;

(g) accessing, when said outputting in step (e) outputs the key storage access admission signal, the key storage to obtain the storage key, and outputting a key storage check signal and the storage key;

(h) producing a coincidence signal if the storage key and the access request key coincide; and (i) generating the main storage access admission signal based upon the coincidence signal and the key storage check signal.

* * * * *

UNITED STATES PATENT AND TRADEMARK OFFICE
CERTIFICATE OF CORRECTION

PATENT NO. : 4,954,982
DATED : September 4, 1990
INVENTOR(S) : Terutaka Tateishi et al.

It is certified that error appears in the above-identified patent and that said Letters Patent is hereby corrected as shown below:

Col. 3, line 23, "analysis The" should be --analysis. The--;

Col. 6, line 51, "logic level" should be deleted.

Col. 8, line 8, "storage accessed storing a storage key" should be --storage storing a storage key accessed.--.

Signed and Sealed this

Eleventh Day of February, 1992

Attest:

*Attesting Officer*

HARRY F. MANBECK, JR.

*Commissioner of Patents and Trademarks*